United States Patent
Johnson et al.

(10) Patent No.: US 9,465,592 B1
(45) Date of Patent: Oct. 11, 2016

(54) INJECTION OF SUPPLEMENTAL COMPUTER INSTRUCTIONS

(71) Applicant: Amazon Technologies, Inc., Seattle, WA (US)

(72) Inventors: Stephen C. Johnson, Fullerton, CA (US); Michael R. Siwapinyoyos, Cerritos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/703,785

(22) Filed: May 4, 2015

Related U.S. Application Data

(63) Continuation of application No. 13/797,233, filed on Mar. 12, 2013, now Pat. No. 9,027,004.

(51) Int. Cl.
*G06F 9/45* (2006.01)

(52) U.S. Cl.
CPC .. *G06F 8/41* (2013.01); *G06F 8/53* (2013.01)

(58) Field of Classification Search
None
See application file for complete search history.

(56) References Cited

U.S. PATENT DOCUMENTS

| | | | |
|---|---|---|---|
| 7,861,290 B2 | 12/2010 | Meyer et al. | |
| 8,370,818 B2 | 2/2013 | Osminer et al. | |
| 9,027,004 B1 * | 5/2015 | Johnson | G06F 8/41 717/140 |

* cited by examiner

*Primary Examiner* — Chuck Kendall
(74) *Attorney, Agent, or Firm* — Baker & Hostetler LLP

(57) ABSTRACT

Application computer instructions can be provided to a publishing server. The publishing service can parse the application computer instructions to identify one or more locations where supplemental computer instructions can be inserted. Metadata about purchasable items can be obtained and the supplemental computer instructions can be written based on the item metadata. The supplemental computer instructions can be inserted into the application computer instructions. A publishable application can be created by compiling the application computer instructions with the inserted supplemental computer instructions.

20 Claims, 9 Drawing Sheets

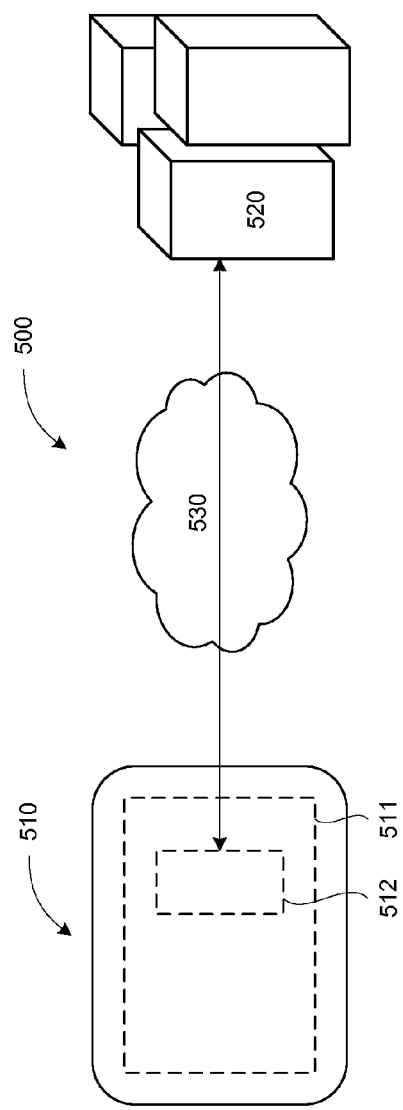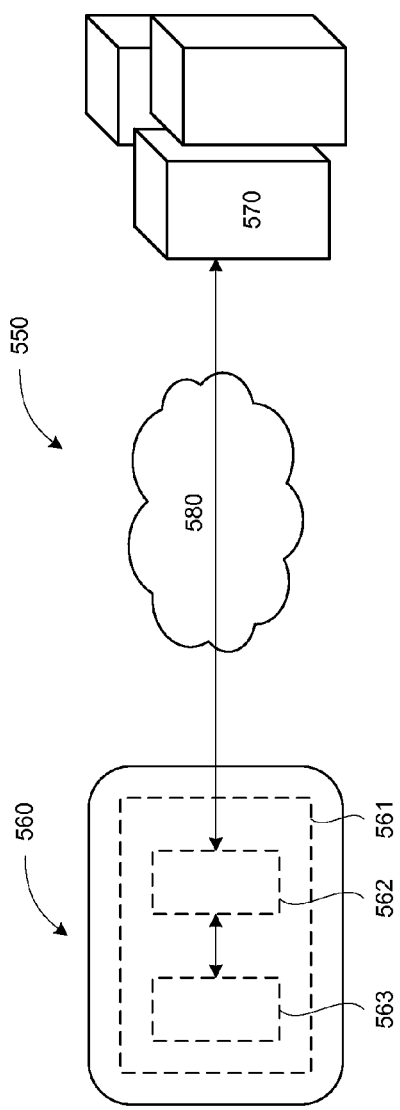

INJECTION OF SUPPLEMENTAL COMPUTER INSTRUCTIONS

CROSS REFERENCE TO RELATED APPLICATIONS

This application is a continuation of U.S. patent application Ser. No. 13/797,233 filed on Mar. 12, 2013, the entire contents of which are incorporated herein by reference in its entirety.

BACKGROUND

Mobile applications are used on many computing devices. As the number of mobile computing devices, such as laptop computers, tablets, cell phones and the like increases, the usage of such applications also increases. Applications have been developed for a wide range of functions. For example, email client applications can provide users with the ability to compose, send and receive email messages on the computing device; social network applications can allow users to interact within a social network from the computing device; gaming applications can allow a user to play a game on the computing device and/or participate in an online multiplayer game using the computing device; music and audio applications can allow a user to listen to and/or edit music and audio on the computing device; photo and video applications can allow a user to capture and/or edit pictures and video; and so forth. Each application provides a user of the mobile device with some functionality. Users can install any number of different applications on a computing device.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 5A, 5B and 6 depict embodiments of computing devices interacting with physical product sales servers.

DETAILED DESCRIPTION OF ILLUSTRATIVE EMBODIMENTS

Figure 2:
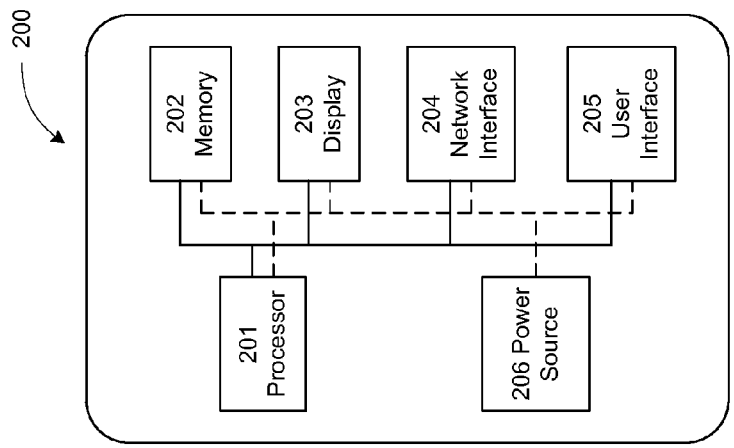
FIGS. 1 and 2 depict embodiments of external and internal components of a computing device.

Applications operating on a computing device can provide users with functionality. However, many applications, particularly those for mobile computing devices, are limited to a specific set of functions. For example, the maker of sports apparel may create an application for users to track their fitness activities. The fitness activities application may provide users with the ability to enter and store fitness activity information, to track routes of runs and hikes, and the like. However, the fitness activity application may not have capabilities to take customer orders for sports apparel. Adding additional features to an application, such as the ability to take customer orders for sports apparel in the fitness activity application example, may require the application developer to put into place additional resources, such as a server to fulfill customer orders, that it does not have in place.

A developer of an application can take advantage of a third party sales service by interfacing with a sales service. For example, a sales service can provide developers with tools in a software development kit (SDK) or an application programming interface (API) that enables the developer to include, within the application, functionality to interface with the sales service. The SDK or API can provide tools that permit an application to interact with a server associated with the sales service. The SDK or API can also provide tools that permit an application running on a computing device to interact with sales application running on the same computing device, where the sales application can act as an intermediary between the developer's application and the sales service. Providing an SDK or an API to application developers can be costly for a sales service. The sales server must invest resources to develop the SDK or API, to educate large numbers of developers how to use the SDK or API, to assist developers to troubleshoot problems when their applications fail to properly interface with the sales service and so forth.

Instead of providing an SDK or an API to developers, a sales service can inject computer instructions for sales functionality into a developer's application. Computer instructions can include one or more instructions that can be executed by a computing device. Computer instructions can include computer-readable instructions, computer-executable instructions, source code, compiled code, byte code, binary code, applet, assembly language and the like, or any combination thereof. Computer instructions can be written in an established programming language, such as Java, C, C++, Perl, JavaScript, and the like. Mobile applications, in particular, can be written as native applications, platform-generic applications, or hybrid applications. Native mobile applications are specific to a particular mobile platform, such as iOS or ANDROID. Such applications use development tools and language supported by the mobile platform, such as Xcode and Objective-C with iOS, Eclipse and Java with ANDROID, and the like. Platform-generic applications can be written using languages that are generic to the mobile platform, such as HTML, HTML5, JavaScript, CSS and the like. Such applications can be distributed across a range of mobile platforms, though they may not be able to take full advantage of the specific capabilities of each mobile platform. Hybrid applications can include some platform-generic computer instructions, such as instructions written in HTML5, embedded inside of platform-specific computer instructions. Such hybrid applications are able to take advantage of specific functionality of the mobile platform while the platform-generic portion can be used across mobile platforms.

In one embodiment, the developer can register, with a developer portal of the sales server, items that will be available for purchase via the developer's application. The developer can submit an application for distribution. The sales service can inspect the application's computer instructions, decompiling the computer instructions if necessary. When inspecting the computer instructions, the sales service can identify locations in the computer instructions where sales capability can be inserted. The sales service can inject computer instructions into the application that is configured to perform all sales functions associated with taking user orders for the developer's registered items. In this manner, the sales service itself will include the sales functionality into the application's computer instructions, thereby eliminating the need for the developer to understand how to add sales functionality to the application's computer instructions. In another embodiment, the developer can set certain configurable options for the appearance of the sales functionality within the computer instructions. When the sales service injects computer instructions into the application, the sales service can modify the sales computer instructions according to the options set by the developer.

Figure 1:
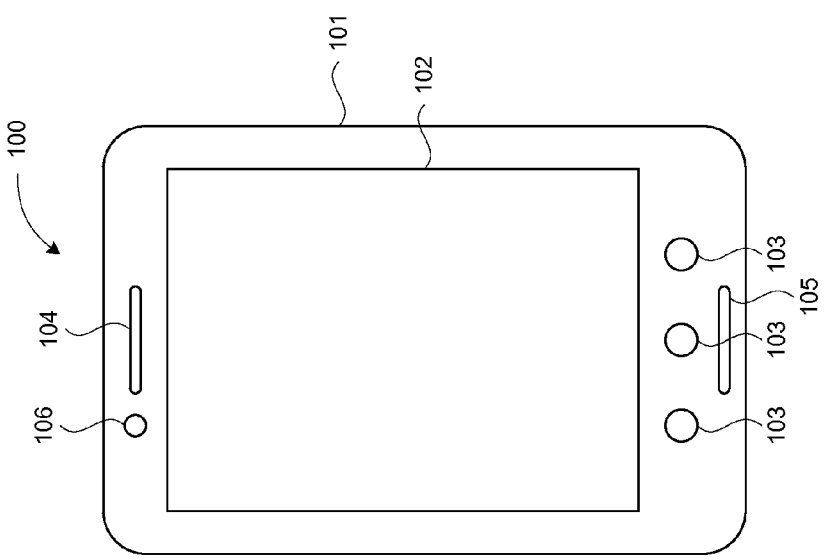

FIG. 1 depicts an embodiment of an exterior of a computing device 100. It should be understood that this is merely an example for discussion, and that a number of additional components, configurations, assemblies and combinations are possible as known in the art. Computing device 100 can be any form of a computer, such as a desktop computer or laptop computer, a tablet computing device, a cell phone, a handheld computing device or any other form of computing device. Computing device 100 can include a housing 101. The housing 101 can be made of any material or combinations of materials, such as various types of plastic, metal, glass and combinations thereof, that is suitable to house the components of device 100. Computing device 100 can also include a display 102 that can display images, text, any other type of visual information and any combination thereof. Display 102 can also be a touchscreen display that is capable of sensing the presence and location of one or more touches of the display 102. A touchscreen display can sense touches by a user, such as a touch by a finger or a hand, and touches by objects, such as a stylus. Display 102 can be part of a user interaction system of the computing device 100.

Computing device 100 can also include one or more hard buttons 103 integrated into housing 101. In one embodiment, the one or more hard buttons 103 can include a single button, such as a home button or a power button. In another embodiment, the one or more hard buttons 103 can include a small set of buttons, such as a power button, a home button, and a back button. In yet another embodiment, the one or more hard buttons 103 can include a large set of buttons, such as a full QWERTY keyboard, a keypad and the like. The one or more hard buttons 103 can be part of the user interaction system of the computing device 100.

Computing device 100 can also include a speaker 104 configured to emit sounds and a microphone 105 configured to receive sounds. In the embodiment where computing device 100 is a cell phone, speaker 104 and microphone 105 can be used to carry on a telephone call. In one embodiment, speaker 104 can be configured to play sounds associated with graphics displayed on display 102, such as during play of audiovisual material on computing device 100. In another embodiment, microphone 105 can receive audio sounds which the computing device 100 can interpret as user inputs. In addition, while not depicted in FIG. 1, computing device 100 can also include an audio port which can be connected to an external microphone and/or an external speaker or speakers. Computing device 100 can send and receive audio signals via the audio port and interpret the received audio signals via the audio port just as it would interpret audio signals generated from sounds received by the microphone 105.

Computing device 100 can also include one or more optical devices 106. In one embodiment, an optical device can include an optical sensor, such as an infrared sensor, a visible light sensor and/or any device that can sense light and/or electromagnetic energy. The detection of light and/or electromagnetic energy can be used by the computing device 100 to control components of the computing device 100, such as a level of light emitted by a backlight of display 102, illumination of one or more hard keys 103 and any other aspect of computing device 100. In another embodiment, an optical device can include an image-capturing device, such as a digital camera. An image-capturing device can include any device configured to capture an image, such as a complementary metal-oxide-semiconductor (CMOS) active pixel sensor (APS) and a charged coupled device (CCD). Images captured by one or more optical devices 106 can be stored by the computing device 100 as an individual image or as a series of images in a video. Individual images and/or video images can be processed by computing device 100 and interpreted as user inputs. While FIG. 1 depicts one optical device 106 pointing in the same direction as the display 102, it is possible for computing device 100 to have any number of optical devices 106 and it is possible for one or more optical devices 106 to be pointed in other directions, such as a rear-facing camera pointing in the opposite direction of display 102.

FIG. 2 depicts an embodiment of internal components of a computing device 200. It should be understood that this is merely an example for discussion, and that a number of additional components, configurations, assemblies and combinations are possible as known in the art. Computing device 200 can include at least one processor 201 that is able to execute instructions stored in one or more memories 202. The one or more memories 202 can include instructions for running an operating system, instructions for running applications within the operating system, a system management agent and any other kind of instructions. The at least one processor 201 can generate information on a display component 203. Display component 203 can include one or more of a display driver, a display card, display 102 or any other hardware and/or software required to display an image or series of images. Computing device 200 can also include a network interface 204 that allows the device to send and receive information signals via a network. Network interface 204 can include any type of network adapter for connecting to a network, such as an adapter to establish a connection to the Internet, to a wired or wireless intranet, to a cellular network or to a wireless network. Computing device 200 can also include a user interface 205. User interface 205 can include one or more components, such as display 102, one or more hard buttons 103, speaker 104, microphone 105 and optical devices 106, that can provide information to a user and/or receive inputs from a user. User interface 205 can also include one or more external components, such as an external keyboard, external mouse, external microphone, external speaker and the like.

Computing device 200 can include at least one power source 206. Power source 206 can provide power to any or all of the other components in computing device 200. As depicted in FIG. 2, power source 206 can be connected to, and provide power to, each of processor 201, memory 202, display 203, network interface 204 and user interface 205. Power source 206 can be any type of power source, such as one or more disposable batteries, a rechargeable battery and the like. In the embodiment where computing device 200 is a portable device, such as a laptop computer, a tablet computer, a cell phone, a hand held computer and the like, the power supply 206 may need to provide power for a period of time between recharging of the power source 206.

In other embodiments, computing device 200 can be a desktop computer, workstation, server or other non-portable device that is typically connected to an external power source any time that computing device 200 is active. With such non-portable computing devices, certain elements, such as a display, user interface components and the like may also be external to the computing device.

Figure 3:
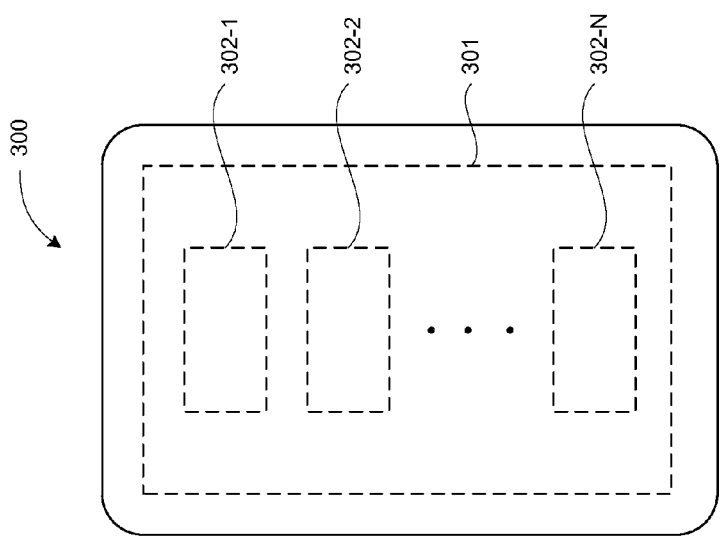
FIG. 3 depicts embodiments of software components operating on a computing device.

FIG. 3 depicts an embodiment of software on a computing device 300. Computing device 300 can have an operating system 301. The operating system 301 can be configured to operate on a particular type of computing device, such as a desktop computer, a laptop computer, a tablet computer, a cell phone, a personal digital assistant and the like. Any number of applications, such as applications 302-1, 302-2, . . . , 302-N, can be installed on and operate within operating system 301. Applications 302 can provide any number of functions to a user of the computing device. In some examples, one of applications 302 can include one or more of the following: a web browser that provides a user with an ability to browse websites, a message client that allows a user to send and receive messages, a social networking application that allows a user to access a social network and the like. Applications 302 can demand operations from components of the computing device 300, such as display of graphics on a display, play of sounds through a speaker or audio port, network communications by a network interface, reception of user inputs through a user interface and the like. Applications 302 can be stand-alone applications, being able to provide functions without the aid of another application, and applications 302 can be configured to interact with others of applications 302.

Figure 4:
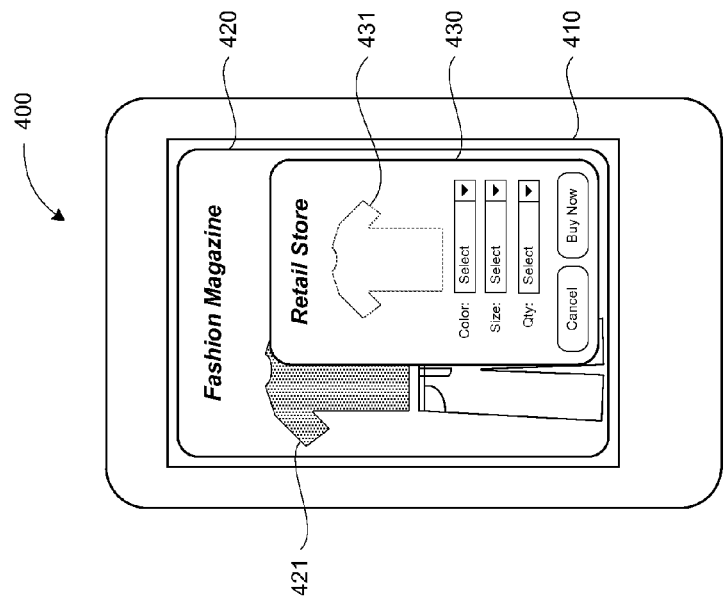
FIG. 4 depicts an embodiment of multiple software user interfaces on a computing device display.

FIG. 4 depicts an embodiment of a display of applications running on a computing device 400. Computing device 400 can have a display 410, among any number of other components that are not shown in FIG. 4. In the embodiment depicted in FIG. 4, display 410 shows a first user interface 420 and a second user interface 430. The first user interface 420 and the second user interface 430 can be user interfaces from the same application or from different applications. In the embodiment shown in FIG. 4, the first user interface 420 can be associated with a fashion magazine that depicts items available for sale, such as various items of clothing. The second user interface 430 can be associated with an application that allows users to purchase items from an online sales store.

In one embodiment, to arrive at the arrangement of the user interfaces shown in FIG. 4, the first user interface 420 could have been completely visible showing a shirt 421 and other clothing. The depiction in the first user interface 420 could have included information about the clothing, such as the brand and name of the clothing (e.g., LEVI 501), available colors or styles, type of fabric and the like. When the user selects an item of clothing, such as shirt 421, that item can be highlighted, as is shown by the fill on shirt 421 of first user interface 420. Selecting an article of clothing in first user interface 420 can cause the second user interface 430 to be overlaid over some or all of the first user interface 420. The second user interface can include a depiction 431 of the selected item 421 in the first user interface 420. The second user interface 430 can also include other elements, such as text boxes, drop-down boxes, command buttons and the like to provide additional functionality for the user. In the embodiment depicted in FIG. 4, the second user interface 430 includes drop down boxes to select a color, a size and a quantity of the selected shirt, as well as command buttons for enabling a user to make a purchase or close the second user interface 430.

Referring now to FIGS. 5A and 5B, depicted are embodiments of applications operating on a computing device and interacting with a sales server. The system 500 depicted in FIG. 5A includes a computing device 510 and a sales server 520 connected via a network 530. Computing device 510 includes an operating system 511 and at least one application 512. Application 512 can be a sales application provided by an operator of sales server 520. Sales application 512 can operate as a stand-alone application, providing a user with functionality to search for available products and make purchases of those products. Sales application 512 can communicate with sales server 520 to submit search terms and/or queries for available products, to identify available products and information about available products, to receive recommendations about additional products that may be of interest to a user, to transmit purchase requests for fulfillment and the like.

Application 512 can also be a third party application. Third party application 512 can be developed and produced by an entity other than a sales entity associated with sales server 520. Third party application 512 can be any type of application, such as an email client application, a social network application, a gaming application, a music/audio application, a photo/video application or any other type of application. In one embodiment, an operator of sales server 520 can provide application developers, such as a developer of third party application 512, with tools in an SDK or an API that enable third party application 512 to interface with sales server 520. The SDK or API can provide tools for the third party application 512 to communicate with sales server 520 to obtain any or all of the information, functionalities and features of sales server 520.

Sales server 520 can include one or more computing devices configured to communicate with application 512, to service inquiries from application 512 about available products, to fulfill product order purchases and the like. In addition to being configured to communicate with application 512, sales server 520 can also be configured to host one or more websites that are accessible via a conventional web browser operating on a computing device. When sales server 520 receives an order for a product, it can initiate a process to charge an account of the user for the amount of the purchase price and to ship the product to the purchaser.

The system 550 depicted in FIG. 5B includes a computing device 560 and a sales server 570 connected via a network 580. Computing device 560 includes an operating system 561 and at least two applications 562 and 563. Application 562 can be a sales application provided by an operator of sales server 570. Sales application 562 can operate as a stand-alone application, providing a user with functionality to search for available products and make purchases of those products. Sales application 562 can communicate with sales server 570 to submit search terms and/or queries for available products, to identify available products and information about available products, to receive recommendations about additional products that may be of interest to a user, to transmit purchase requests for fulfillment and the like. Sales server 570 can include one or more computing devices configured to communicate with sales application 562, to service inquiries from sales application 562 about available products, and to fulfill product order purchases.

Application 563 can be a third party application. Third party application 563 can be developed and produced by an entity other than a sales entity associated with sales server 570. Third party application 563 can be any type of application, such as an email client application, a social network application, a gaming application, a music/audio application, a photo/video application or any other type of application.

The sales application 562 can serve as an intermediary between third party application 563 and sales server 570. Doing so can allow a developer of the third party application 563 to interface with sales server 570 without having to know exactly how to interface with sales server 570. In one embodiment, an operator of sales server 570 can provide application developers, such as a developer of third party application 563, with tools in an SDK or an API that enable third party application 563 to interface with sales application 562. The SDK or API can provide tools for the third party application 563 to communicate with sales application 562 to obtain any or all of the information, functionalities and features of sales server 570.

Figure 6:
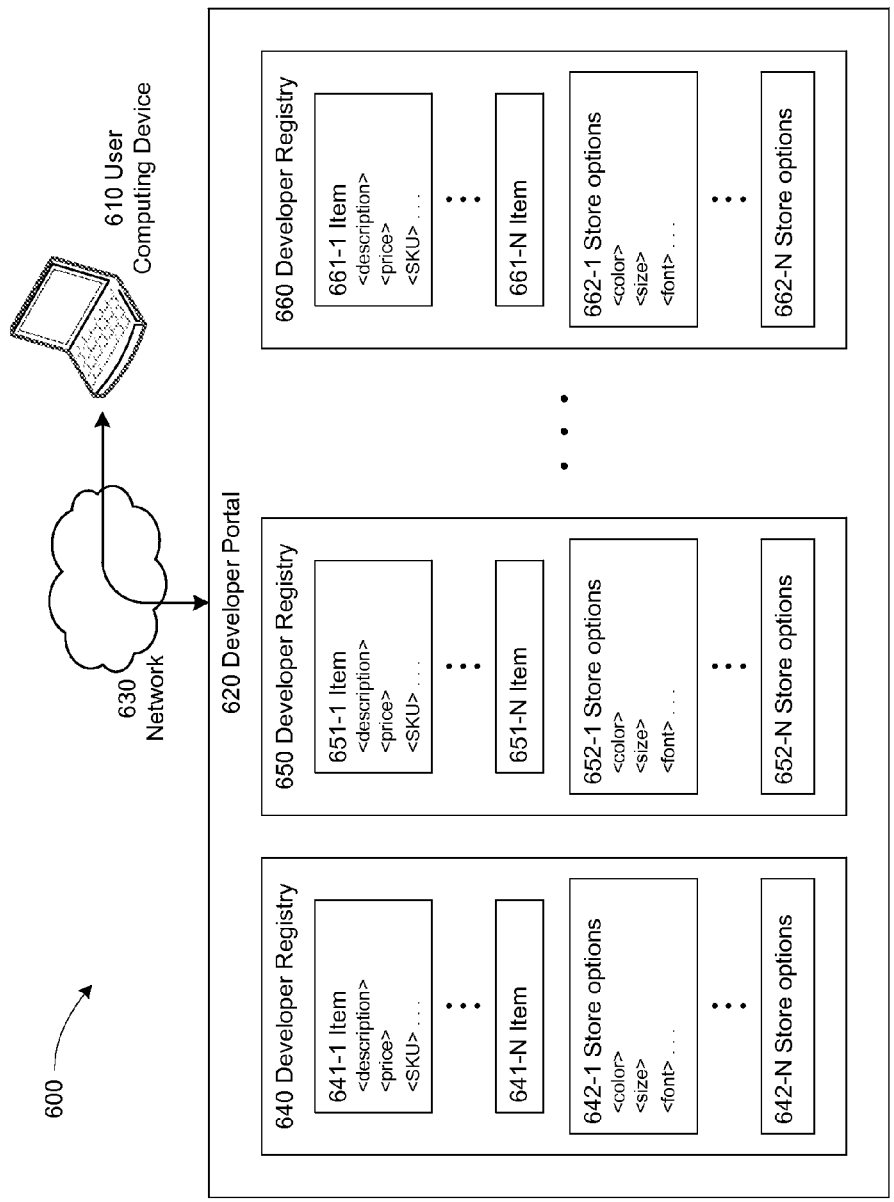

Depicted in FIG. 6 is an embodiment of a developer portal accessible by a developer computing device. The system 600 depicted in FIG. 6 includes a developer computing device 610 and a developer portal 620 connected via a network 630. Computing device 610 can be any type of computing device, such as a desktop computer, a laptop computer, a tablet computer, a cell phone and the like. Network 630 can include any type of wired network, wireless network, or any combination thereof. Developer portal 620 can be hosted on one or more computing device that are accessible to network 630. In one embodiment, developer portal 620 can be hosted by a sales server and made available for interface with computing device 610 via a website.

Developer portal 620 can include a number of developer registries 640, 650 and 660. While three developer registries 640, 650 and 660 are depicted in FIG. 6, the developer portal 620 can fewer or more than three developer registries. Each of the developer registries can be associated with one particular developer or a developer account. A developer account can be shared with multiple users. For example, a company may have a single developer registry for use by the company with multiple developers having access to the one developer registry. The developer portal 620 can require authentication before a user can access any one of the developer registries 640, 650 and 660. Authentication can include any or all of the entry of a user name and password, the entry of a PIN, the submission of a token, passing of a cookie from user computing device 610, verification of a biometric feature and the like. Once a user has been authenticated, the developer portal 620 can grant the user access to add, edit or delete information from the appropriate developer registry.

A developer can include, in developer registry 640, any number of items 641-1 to 641-N. Each of the items 641 can represent a product that is purchasable from the developer. In the developer registry 640, each item can have metadata associated with the item 641. For example, any one of items 641 can include metadata, such as any or all of a name, a description, a color, a size, a stock keeping unit (SKU) code, a price and the like. Each item 641 can also include an indication of one or more of the developer's applications in which the item 641 will be available for purchase. The metadata associated with each of items 641 can be sufficient to create computer instructions for offering the items 641 for sale in an application. When a developer accesses developer registry 640, the user can add new items 641, delete existing items 641, or edit existing items 641. Other developer registries 650 and 660 in developer portal 620 can include their own items, such as items 651-1 to 651-N and 661-1 to 661-N, respectively. Those items 651 and 661 can be added to, edited and deleted, when the appropriate developer registry 650 or 660 is accessed.

A developer can include, in developer registry 640, any number of sets of store options 642-1 to 642-N. Each set of store options 642 can represent settings for an application store front for which computer instructions can be injected into one or more of the developer's applications. For example, a set of store options 642 can include settings, such as primary colors, secondary colors, window sizes, fonts, font sizes and the like. Each set of store options 642 can also include an indication of one or more of the developer's applications in which a store front according to the set of store options 642 will appear. Supplemental computer instructions can be developed for injection into the developer's application based on the set of store options 642. When a developer accesses developer registry 640, the user can add new sets of store options 642, delete existing sets of store options 642, or edit existing sets of store options 642. Other developer registries 650 and 660 in developer portal 620 can include their own set of store options, such as set of store options 652-1 to 652-N and 662-1 to 662-N, respectively. Those set of store options 652 and 662 can be added to, edited and deleted, when the appropriate developer registry 650 or 660 is accessed.

Figure 7A:
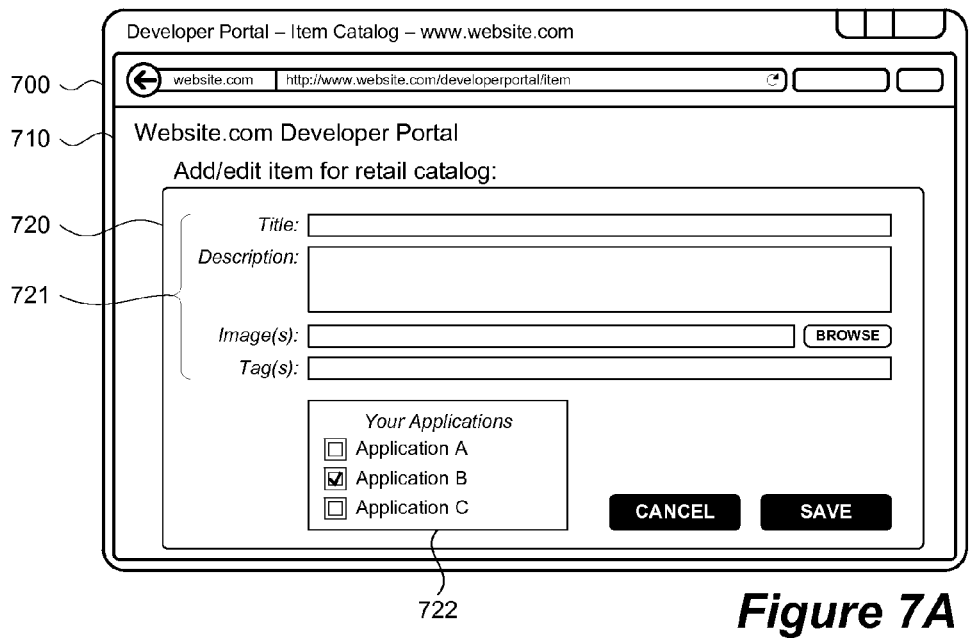
FIGS. 7A and 7B depicts an embodiment of a method for requesting product recommendations for a user.

Depicted in FIG. 7A is an embodiment of a user interface of a developer portal accessible for adding or editing items in a developer registry. FIG. 7A depicts a web browser 700 that includes a user interface 710 of a developer portal for adding or editing items. The user interface 710 includes a frame 720 in which the item metadata can be entered and/or modified. In the embodiment shown in FIG. 7A, the frame 720 includes user interface elements 721, including text boxes for entering a title of the item, a description of the item, one or more images of the item, and one or more tags for the item. Frame 720 also includes checkboxes 722 for the user to select one of more of the user's applications in which the item will be available for sale. The user interface 710 can include other elements, such as the browse, cancel and save command buttons depicted, the text above frame 720, and any other element. Item metadata entered into user interface 710 can be stored by the developer registry.

Figure 7B:
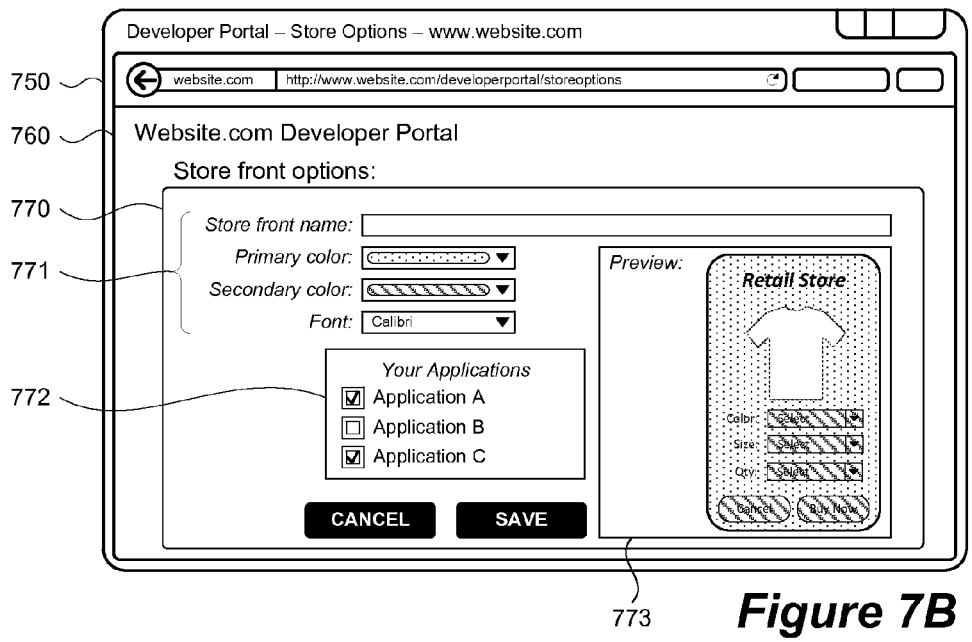

Depicted in FIG. 7B is an embodiment of a user interface of a developer portal accessible for adding or editing sets of application store front options in a developer registry. FIG. 7B depicts a web browser 750 that includes a user interface 760 of a developer portal for adding or editing sets of application store front options. The user interface 760 includes a frame 770 in which store front options can be entered and/or modified. In the embodiment shown in FIG. 7B, the frame 770 includes user interface elements 771, including text boxes for entering a name of the set of application store front options, a primary color of the set of application store front options, a secondary color of the set of application store front options, and a font of the set of application store front options. Frame 770 also includes checkboxes 772 for the user to select one of more of the user's applications in which this set of application store front options will be used. Frame 770 also includes a preview 773 which depicts how the application store front may look when the appropriate computer instructions are incorporated into the user's application. The user interface 760 can include other elements, such as the cancel and save command buttons depicted, the text above frame 770 and any other element. The sets of application store front options entered into user interface 760 can be stored by the developer registry.

Figure 8:
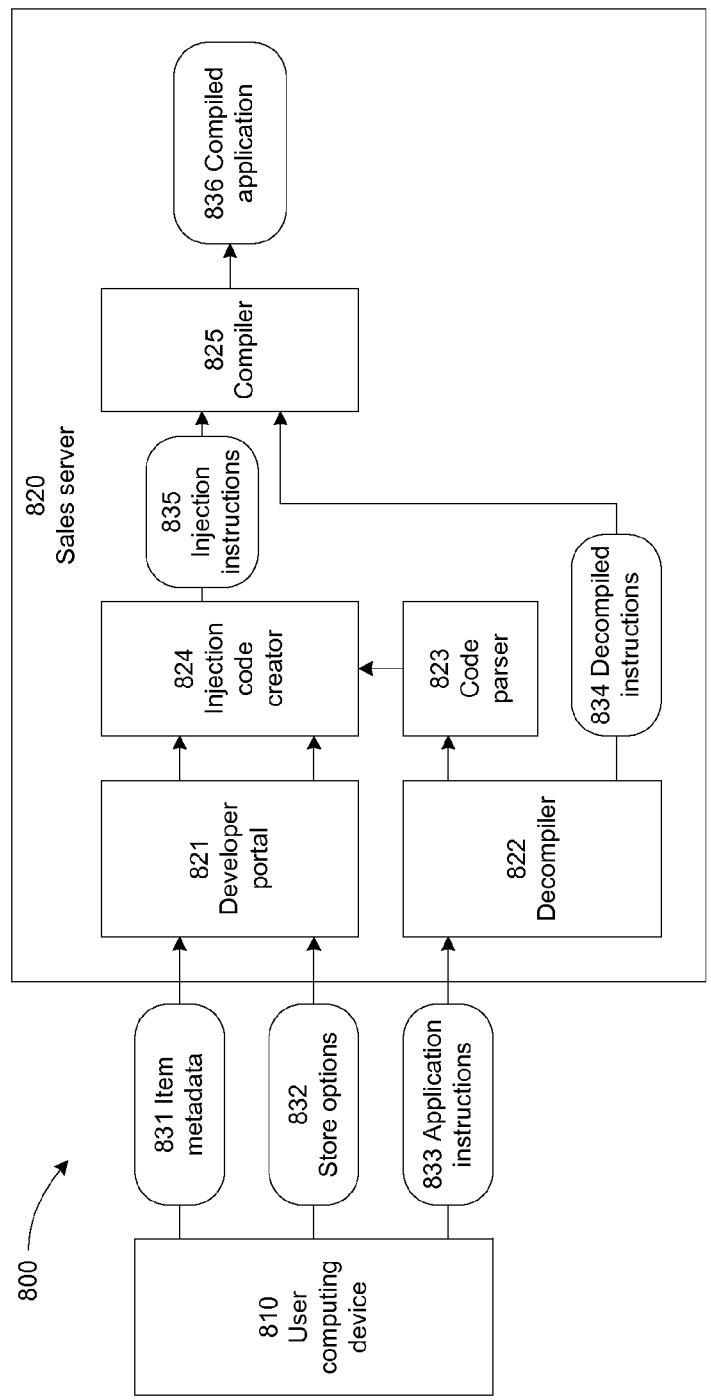
FIG. 8 depicts an embodiment of a method of a sales application handling a request for product recommendations from a third party application.

FIG. 8 depicts an embodiment of a system for injecting sales computer instructions into an application. The system 800 depicted in FIG. 8 includes a user computing device 810 and a sales server 820. The user computing device 810 and the sales server 820 can be connected by way of a network, such as one or more wireless networks, one or more wired networks or any combination thereof. The user computing device 810 can provide item metadata 831 and store options 832 to developer portal 821 of sales server 820. The user computing device 810 can also provide application computer instructions 833 to sales server 820. When the user computing device 810 provides application computer instructions 833, a request for sales options can also be submitted. The request for sale options can indicate to sales server 820 that supplemental code should be inserted into the application computer instructions. The depiction in FIG. 8 shows that a decompiler 822 can receive the application computer instructions 833. If the application computer instructions 833 are already compiled, then decompiler 822 can decompile the application computer instructions. However, if application computer instructions 833 are not compiled, then the decompiler 822 is optional. Decompiler 822 can translate an executable application into a set of instructions that resembles source code. While decompiler 822 may not reconstruct the original source code exactly, the decompiled instructions may resemble the original source code enough to edit the application's computer instructions.

Sales server 820 includes a parser 823 that can inspect the decompiled application computer instructions. The parser 823 can identify locations within the decompiled computer instructions where supplemental computer instructions are to be injected. In one embodiment, the parser 823 can identify locations in the computer instructions that execute when certain events occur, such as computer instructions that are executed when the application is launched, computer instructions that are executed when the application resumes, computer instructions that are executed when the application is stopped and computer instructions that are executed at other events. For example, when the application is launched or resumed, the computer instructions parser 823 can identify that supplemental computer instructions should execute to refresh any item metadata so that the application also has the most recent version of any item metadata. In another embodiment, the parser 823 can identify locations in the computer instructions where the developer has indicated that supplemental computer instructions should be executed. For example, the developer could insert a particular string of text into the application computer instructions that the parser 823 recognizes as an indication that supplemental computer instructions should be executed, the developer could insert a comment in the application computer instructions that the parser 823 interprets as an indication that supplemental computer instructions should be executed and the like. In another embodiment, the application computer instructions can include a call to execute supplemental computer instructions where the computer instructions associated with the call are not included in the application computer instructions. In another embodiment, the parser 823 can identify instances where the application computer instructions include computer instructions associated with a SDK or an API of the sales service. For example, the computer instructions parser 823 can identify computer instructions where the developer has used, or attempted to use, SDK or API functions so that those functions can be replaced by injected computer instructions. Any number of other embodiments of computer instructions locations where supplemental computer instructions are to be injected can be identified by the computer instructions parser 823.

Parser 823 can send an indication to injection computer instructions generator 824 of the injection computer instructions that is to be created. In one embodiment, the parser 823 can send injection computer instructions generator 824 an indication of one or more locations in the application computer instructions where supplemental computer instructions are to be injected. For example, the parser 823 can send injection computer instructions generator 824 an indication that computer instructions are to be injected in a location with application start up computer instructions, in a location with application resume computer instructions or any other location. In another embodiment, the parser 823 can send injection computer instructions generator 824 an indication of one or more types of supplemental computer instructions that are to be injected into the application computer instructions. For example, the parser 823 can send injection computer instructions generator 824 an indication that computer instructions to refresh item metadata will be injected, that computer instructions to launch an application store within the application user interface will be injected, that computer instructions to process a user order will be injected, or that any other type of sales computer instructions will be injected.

Injection computer instructions generator 824 can create injection computer instructions 835 based on the information received from the parser 823, item metadata 831 stored in developer portal 821, and store options 832 stored in developer portal 821. The injection computer instructions 835 can include computer instructions that, when included in the application computer instructions, will allow the application to perform sales functions. In one embodiment, the injection computer instructions 835 can include all of the computer instructions necessary for the application to perform the sales functions on its own. In another embodiment, the injection computer instructions 835 can include computer instructions for the application to interact with a sales application operating on the same computing device to provide the sales functions. For example, the injected computer instructions can include a call to a sales application on the same computing device to display a product purchase page for an item, such as the product purchase page 430 depicted in FIG. 4. In another embodiment, the injection computer instructions 835 can include computer instructions for the application to retrieve and/or execute computer instructions residing on a remote computing device. For example, in an example sometimes referred to as a cloud-based solution, some or all of the computer instructions needed to perform the sales functions can be located on a remote computing device that is accessible to the computing device on which the application is operating. In this example, the injection computer instructions 835 can include a call for the remote computing device to perform some function, to provide some information, or any other function. In another embodiment, the injection computer instructions 835 can include computer instructions for the application to interact with a second application, such as a retail application operating on the same computing device. For example, the injection computer instructions 835 can include instructions for the application to request that a retail application retrieve item metadata related to one or more purchasable items or to request that a retail application display information about one or more purchasable items. One possible benefit of this example is that a developer could modify item metadata in a developer portal after an application has been released and the retail application can retrieve the updated item metadata each time the application requests that the retail application retrieve item metadata.

Sales server 820 also includes a compiler 825. The compiler 825 can receive the decompiled application computer instructions 834 and the injection computer instructions 835, and insert the injection computer instructions 835 into the decompiled application computer instructions 834 at the appropriate one or more locations. Once the injection computer instructions 835 are inserted into decompiled application computer instructions 834, the compiler 825 can compile the computer instructions to produce compiled application computer instructions 836. Sales server 820 may optionally test compiled application computer instructions 836 to identify any issues from the computer instructions injection process. Sales server 820 may also publish the compiled application computer instructions 836. Publication of the compiled application computer instructions 836 may include making the compiled application computer instructions downloadable by consumer computing devices.

Figure 9A:
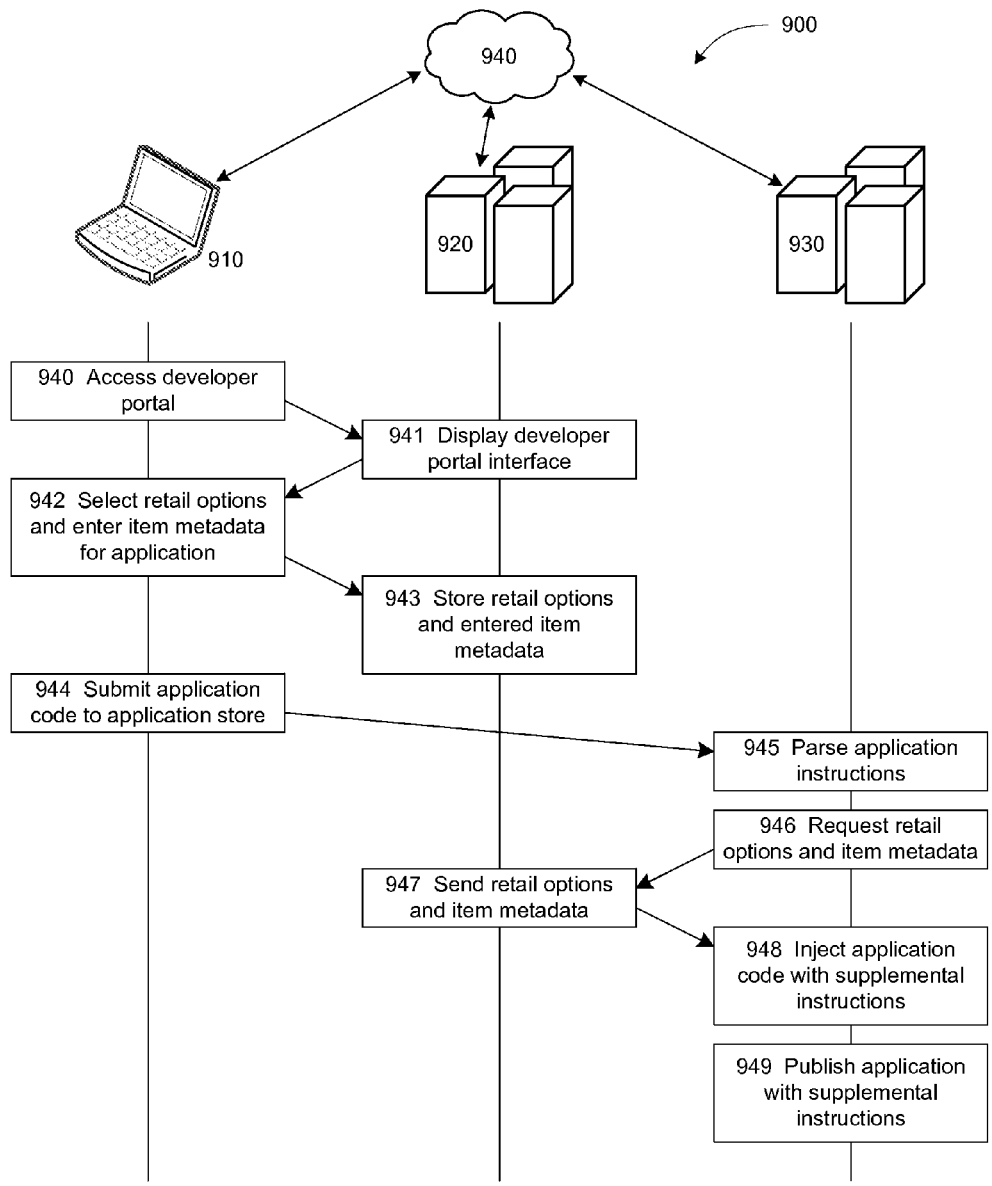
FIGS. 9A and 9B depict an embodiment of an image-based request for product recommendations for a user.
Figure 9B:
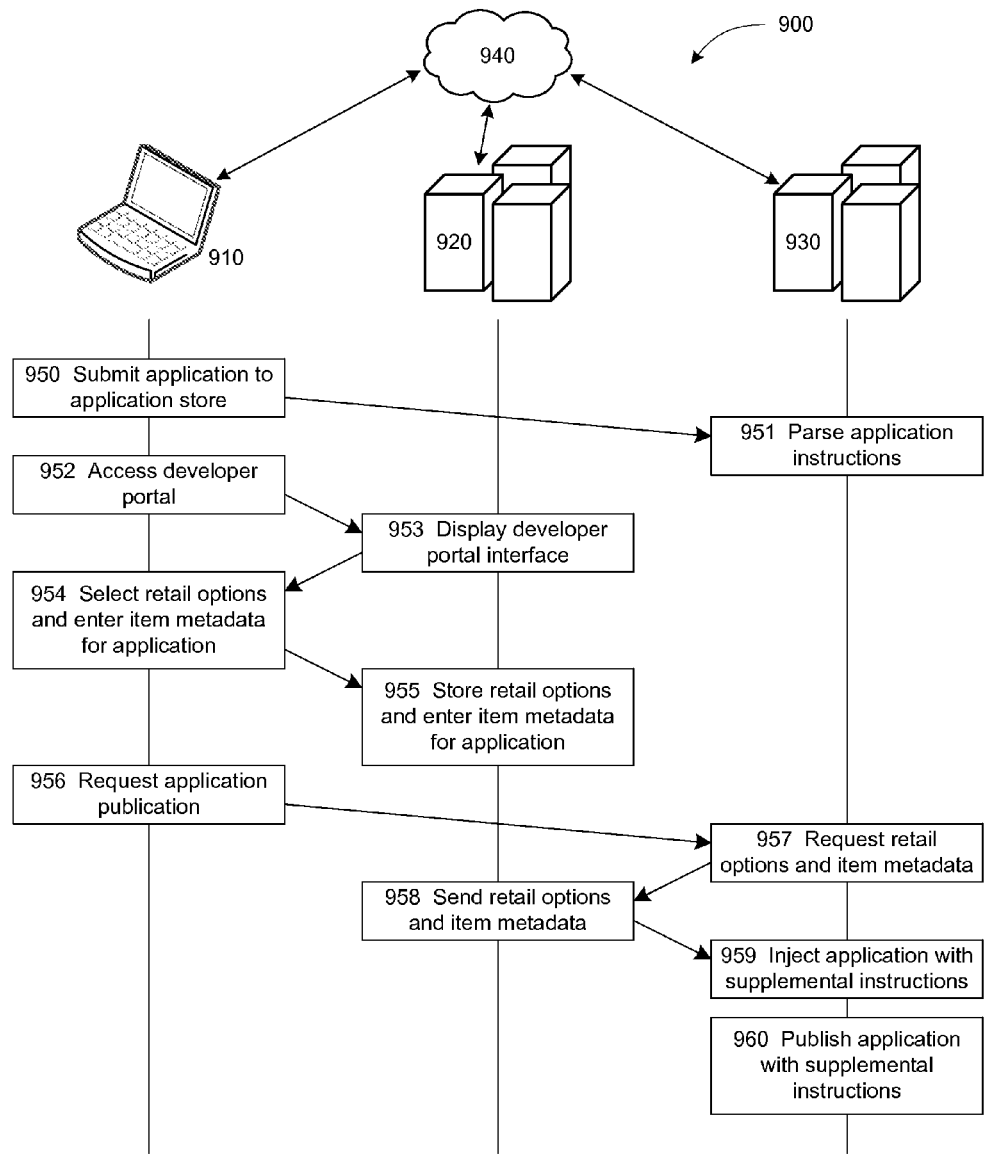

Depicted in FIGS. 9A and 9B are embodiments of a system and methods of injecting supplemental computer instructions into a developer's application. Each of FIGS. 9A and 9B depicts a system 900 with a developer computing device 910, a developer portal server 920 and a publication server 930. The system 900 also includes a network 940 which enables developer computing device 910, developer portal server 920 and a publication server 930 to independently communicate with each other.

FIG. 9A depicts an embodiment of a method of injecting supplemental computer instructions into a developer's application. At block 940, the developer computing device 910 can access a developer portal hosted by the developer portal server 920. Accessing the developer portal can include browsing to a website associated with the developer portal using a web browser, interacting with a specific application on developer computing device 910 that can access the developer portion, or in any other way. At block 941, the developer portal server 920 can display a user interface configured to allow the user to interact with the developer portal. At block 942, the developer, using the developer computing device 910, can select various retail options and enter item metadata for an application. This can include adding or editing items in a developer registry, or adding or editing store front options in a developer registry, such as those described above with respect to FIGS. 6, 7A and 7B. At block 943, the developer portal server 920 can store any retail options and/or item metadata received from the developer computing device 910.

At block 944, application computer instructions can be submitted from developer computing device 910 to publication server 930. The application computer instructions can be in a compiled form or a decompiled form. At block 945, the publication server 930 can parse the application computer instructions. If the application computer instructions are provided in a compiled form, parsing the application computer instructions can include first decompiling the computer instructions. Parsing the application computer instructions can also include identifying one or more locations in the application where supplemental computer instructions may be inserted. The locations where supplemental computer instructions may be inserted can include one or more of a location in the application that executes when a certain event occurs, a location in the application where the developer has indicated that supplemental computer instructions should be executed, a location in the application where a call to execute supplemental computer instructions is placed, a location in the application that includes computer instructions associated with an SDK or an API and the like.

At block 946, the publication server 930 can request retail options and item metadata from the developer portal server 920. The request from the publication server 930 to the developer portal server 920 can include one or more of an indication of the developer, an indication of the application, an indication of one or more items, an indication of a set of store front options and the like. At block 947, the developer portal server 920 can respond to the publication server 930 with the requested retail options and item metadata. At block 948, the publication server 930 can inject the application with the appropriate supplemental computer instructions. As described above, injecting supplemental computer instructions into application computer instructions can include any or all of injecting all of the supplemental computer instructions into the application for performing sales functions, injecting supplemental computer instructions into the application for the application to interface with a sales application on the same computing device, injecting supplemental computer instructions for the application to interface with cloud-based sales services and the like. At block 949, the publication server 930 can publish the application with the injected computer instructions. Publishing the application with the injected computer instructions can include any or all of compiling the application with the injected computer instructions, testing the compiled application with the injected computer instructions, making the application with the injected computer instructions available for download by consumer computing devices and the like.

FIG. 9B depicts an embodiment of a method of injecting supplemental computer instructions into a developer's application. At block 950, application can be submitted from developer computing device 910 to publication server 930. The application computer instructions can be in a compiled form or a decompiled form. The application can be submitted to publication server 930 before any item metadata or sales options stored at developer portal server 920. In one embodiment, when the publication server 930 receives the application, the publication server 930 can send an indication of the application to the developer portal server 920 so that the developer portal server 920 can allow the developer to later select which items or sets of retail options should be associated with the application. At block 951, the publication server 930 can parse the application computer instructions. If the application computer instructions are provided in a compiled form, parsing the application computer instructions can include first decompiling the computer instructions. Parsing the application computer instructions can also include identifying one or more locations in the application where supplemental computer instructions may be inserted.

At block 952, the developer computing device 910 can access a developer portal hosted by the developer portal server 920. Accessing the developer portal can include browsing to a website associated with the developer portal using a web browser, interacting with a specific application on developer computing device 910 that can access the developer portion or in any other way. At block 953, the developer portal server 920 can display a user interface configured to allow the user to interact with the developer portal. At block 954, the developer, using the developer computing device 910, can select various retail options and enter item metadata for an application. This can include adding or editing items in a developer registry, or adding or editing store front options in a developer registry, such as those described above with respect to FIGS. 6, 7A and 7B. At block 955, the developer portal server 920 can store any retail options and/or item metadata received from the developer computing device 910.

At block 956, a request to publish the application can be submitted from developer computing device 910 to publication server 930. At block 957, the publication server 930 can request retail options and item metadata from the developer portal server 920. The request from the publication server 930 to the developer portal server 920 can include one or more of an indication of the developer, an indication of the application, an indication of one or more items, an indication of a set of store front options and the like. At block 958, the developer portal server 920 can respond to the publication server 930 with the requested retail options and item metadata. At block 959, the publication server 930 can inject the application computer instructions with the appropriate supplemental computer instructions. As described above, injecting supplemental computer instructions into application computer instructions can include any or all of injecting all of the supplemental computer instructions into the application for performing sales functions, injecting supplemental computer instructions into the application for the application to interface with a sales application on the same computing device, injecting supplemental computer instructions for the application to interface with cloud-based sales services and the like. At block 960, the publication server 930 can publish the application with the injected computer instructions. Publishing the application with the injected computer instructions can include any or all of compiling the application with the injected computer instructions, testing the compiled application with the injected computer instructions, making the application with the injected computer instructions available for download by consumer computing devices and the like.

Figure 10:
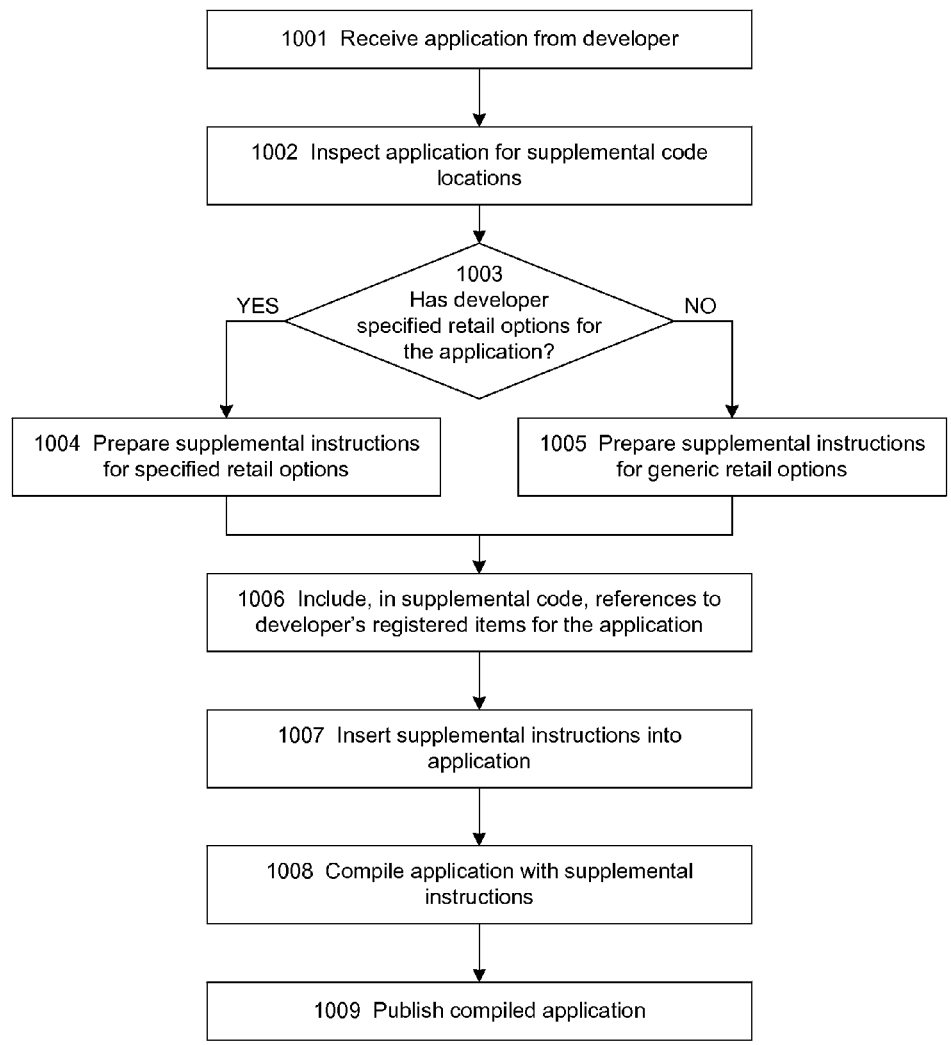
FIG. 10 depicts an embodiment of a method of injecting supplemental computer instructions into a developer's application from the perspective of the application publisher.

FIG. 10 depicts an embodiment of a method of injecting supplemental computer instructions into a developer's application from the perspective of the application publisher. At block 1001, application computer instructions can be received from a developer. At block 1002, the application computer instructions can be inspected for locations where supplemental computer instructions can be injected. Inspecting the application computer instructions can include decompiling the application computer instructions if the application computer instructions were received in a compiled form. At block 1003, a determination can be made whether the developer has specified retail options for the application. If the developer has specified retail options for the application, then, at block 1004, injection computer instructions can be prepared based on the developer's specified retail options. However, if the developer has not specified retail options for the application, then, at block 1005, injection computer instructions can be prepared based on generic retail options. At block 1006, the injection computer instructions can be modified based on item metadata for items that have been registered by the developer. Modifying the injection computer instructions can include inserting, into the injection computer instructions, computer instructions to allow a user to make a purchase of the registered items from the application. As described above, the injection computer instructions can include any or all of computer instructions for the application to perform sales functions, computer instructions for the application to interface with a sales application on the same computing device, computer instructions for the application to interface with cloud-based sales services, and the like. At block 1007, the injection computer instructions can be inserted into the application. The injection computer instructions can be inserted into one or more locations with the application computer instructions. At block 1008, the application computer instructions with the injection computer instructions can be compiled into a publishable application. At block 1009, the compiled application can be published.

Each of the processes, methods, and algorithms described in the preceding sections may be embodied in, and fully or partially automated by, computer instructions modules executed by one or more computers or computer processors. The computer instructions modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for inserting supplemental computer instructions into an application, the system comprising:
   a parser configured to identify one or more locations within a set of decompiled application computer instructions for insertion of the supplemental computer instructions;
   a computer instructions generator configured to generate the supplemental computer instructions based, at least in part, on metadata associated with one or more items and the one or more identified locations, wherein at least a portion of the supplemental computer instructions, when executed, enables a user of the application to make a transaction to acquire the one or more items by a user interacting with the application; and
   a compiler configured to create a compiled application by compiling the decompiled application computer instruction with the supplemental computer instructions inserted at the one or more locations.

2. The system of claim 1, wherein the system is configured to make the compiled application available for download to one or more user computing devices.

3. The system of claim 1, further comprising at least one storage device for storing the metadata associated with the one or more items.

4. The system of claim 3, wherein the metadata associated with the one or more items is associated with a developer of the application computer instructions.

5. The system of claim 4, wherein the storage device comprises configuration options selected by the developer wherein the options control the state of an application store front associated with the supplemental instructions.

6. A system for enhancing the functionality of an application, the system comprising:
   a processor;
   one or more memories in communication with the processor, the one or more memories having stored thereon computer-readable instruction that upon execution configure the system to:
   decompile into a plurality of decompiled computer instructions at least a portion of an application;
   identify one or more locations within the decompiled application computer instructions for insertion of at least one supplemental computer instruction, wherein the supplemental computer instruction adds functionality to the application to enable a user to complete a transaction for one or more items; and
   compile the application by compiling the decompiled application computer instruction with the at least one supplemental computer instruction inserted at the one or more locations.

7. The system of claim 6, wherein functionality to enable a user to complete a transaction for one or more items comprises functionality to enable the application to perform sales functions.

8. The system of claim 7, wherein the sales functionality is performed on a computing device in communication with the system over a network.

9. The system of claim 6, further comprising a registry associated with a developer of the application computer instructions.

10. The system of claim 9, wherein the registry comprises metadata associated with the one or more items.

11. The system of claim 6, wherein the computer-readable instruction that upon execution configure the system to identify one or more locations within the decompiled application computer instructions for insertion of at least one supplemental computer instruction, configures the system to identify at least one location in the application that is configured to execute upon occurrence of at least one predetermined event.

12. The system of claim 11, wherein the at least one predetermined event comprises one or more of startup of the application on a computing device or resume of the application on a computing device.

13. A method for enhancing the functionality of an application, the method comprising:
   decompiling on computing device at least a portion of an application into a plurality of decompiled computer instructions;
   identifying one or more locations within the decompiled application computer instructions for insertion of at least one supplemental computer instruction by parsing the decompiled computer instructions, wherein the supplemental computer instruction adds functionality to the application to enable a user to complete a transaction for one or more items; and
   compiling the application by compiling the decompiled application computer instruction with the at least one supplemental computer instruction inserted at the one or more locations.

14. The method of claim 13, wherein functionality to enable a user to complete a transaction for one or more items comprises functionality to enable the application to perform sales functions.

15. The method of claim 14, wherein the sales functionality is performed on a computing device in communication with the system over a network.

16. The method of claim 13, further comprising a registry associated with a developer of the application computer instructions.

17. The method of claim 16, wherein the registry comprises metadata associated with the one or more items.

18. The method of claim 13, wherein identifying one or more locations within the decompiled application computer instructions for insertion of at least one supplemental computer instruction comprises identifying at least one location in the application that is configured to execute upon occurrence of at least one predetermined event.

19. The method of claim 18, wherein the at least one predetermined event comprises one or more of startup of the application on a computing device or resume of the application on a computing device.

20. The method of claim 13, comprising making the compiled application available for download to one or more user computing devices.

\* \* \* \* \*